United States Patent
Shirai et al.

(10) Patent No.: US 6,919,528 B2
(45) Date of Patent: Jul. 19, 2005

(54) WELDING MACHINE AND WELDING METHOD FOR ENERGY WELDING OF CYLINDER MEMBERS

(75) Inventors: Hideaki Shirai, Okazaki (JP); Koji Murakami, Chiryu (JP); Norio Tanaka, Kariya (JP); Yoshiki Kariya, Nishio (JP); Hiroyuki Nishina, Okazaki (JP); Takayuki Hokao, Anjo (JP)

(73) Assignee: Denso Corporation (JP)

(*) Notice: Subject to any disclaimer, the term of this patent is extended or adjusted under 35 U.S.C. 154(b) by 305 days.

(21) Appl. No.: 10/081,239

(22) Filed: Feb. 25, 2002

(65) Prior Publication Data

US 2002/0117561 A1 Aug. 29, 2002

(30) Foreign Application Priority Data

Feb. 26, 2001 (JP) .......................... 2001-050015
Jan. 21, 2002 (JP) .......................... 2002-011556

(51) Int. Cl.[7] .................. B23K 26/28; B23K 26/30; B23K 15/04
(52) U.S. Cl. .............. 219/121.63; 219/60 R; 219/121.13; 219/121.14; 219/121.64
(58) Field of Search ............. 219/121.63, 121.64, 219/121.13, 121.14, 60 A, 60 R, 61, 125.11, 121.3

(56) References Cited

U.S. PATENT DOCUMENTS 4,176,269 A * 11/1979 Merrick et al. .......... 219/60 A
4,335,906 A * 6/1982 Cardinale et al. .......... 285/22
5,347,101 A * 9/1994 Brennan et al. ........ 219/124.34
5,718,036 A * 2/1998 Oji et al. ................. 29/603.12
6,163,011 A * 12/2000 Urushizaki et al. .... 219/121.64
6,221,505 B1 * 4/2001 Shirai et al. ................ 428/594
6,403,916 B1 * 6/2002 Spooner et al. ......... 219/121.63
2002/0056291 A1 * 5/2002 Schultz et al. ................ 65/392

FOREIGN PATENT DOCUMENTS

| GB | 2165990 A | * 4/1986 |
| JP | 54-64046 |   5/1979 |
| JP | 56-33187 A | * 4/1981 |
| JP | 10-272586 A | * 10/1998 |
| JP | 11-104865 A | * 4/1999 |
| JP | 11-245065 A | * 9/1999 |

* cited by examiner

Primary Examiner—Geoffrey S. Evans
(74) Attorney, Agent, or Firm—Nixon & Vanderhye PC

(57) ABSTRACT

In a welding machine and welding method, for welding cylinder members together about an outside diameter, which prevents the cylinder members from being deformed and corrects the deformation of a portion to be welded, a laser beam, generated by a laser generator, is dispersed in two directions by a spectroscope. The laser beams focus on an outer cylinder member using two optical heads, respectively, in a plane perpendicular to a center axis of outer cylinder member. The optical heads are separated from each other by approximately 90 degrees in the plane. The outer and inner cylinder members are welded to each other in the circular direction using laser beams. Therefore, directions, in which the cylinder members are deformed due to the laser beams, are perpendicular to each other creating uniform radial deformation.

31 Claims, 6 Drawing Sheets

WELDING MACHINE AND WELDING METHOD FOR ENERGY WELDING OF CYLINDER MEMBERS

CROSS-REFERENCE TO RELATED APPLICATION

This application is based on and incorporates herein by reference Japanese Patent Application No. 2001-50015 filed on Feb. 26, 2001, and Japanese Patent Application No. 2002-11556 filed on Jan. 21, 2002.

BACKGROUND OF THE INVENTION

1. Field of the Invention

The present invention relates to a welding machine and a welding method, by which and in which cylinder members are connected together. Specifically, one cylinder member is inserted within another cylinder member and energy is applied to the outside cylinder member, around an outside diameter of the cylinder member, using an energy-applying unit(s), so that the cylinder members become welded together.

2. Description of Related Art

Generally, when multiple cylinder members are welded together around their peripheries, energy is applied to the cylinder members in a single direction using an energy source. An example is shown in FIG. 8. First, an inner cylinder member 201 having a columnar shape is press-fitted into an outer cylinder member 200 having a circular pipe-like shape. Then, a laser beam 211, generated by a laser generator, is focused on the outer cylinder member 200 using an optical head 210 disposed outside the outer cylinder member 200. Thus, the outer cylinder member 200 and the inner cylinder member 201 become welded to each other at a point of contact at an outer periphery while cylinder members 200 and 201 are rotated.

However, when both cylinder members are welded to each other by applying energy to both at only one position, a problem occurs. That is, relative thermal distortion is generated among a non-melted portion, a melted portion due to the applied energy, and a portion starting solidification. For this relative thermal distortion, both cylinder members are deformed from a pre-weld shape 220 shown in FIG. 9A to a post-weld shape 221 shown in FIG. 9B. As shown in FIG. 9B, both cylinder members are deformed in a direction perpendicular to an energy-applying direction, and each cylinder member is deformed to an elliptical shape when viewed in cross-section.

Here, elliptical-deformation processes will be described when the cylinder members are welded in the circular or circumferential direction by applying energy in a single direction using an energy source. Before welding, for example, when one cylinder member is press-fitted into and attached to another cylinder member, both cylinder members are deformed. Then, this deformation is made larger by relative distortion between an expanded portion and a contracted portion due to welding, and each cylinder member is deformed to an elliptical shape in its cross section. Even when the cylinder members are not deformed and substantially have a complete circular shape before welding as shown in FIG. 9A, they are deformed after welding as shown in FIG. 9B. The shape 220 substantially having a circular shape tends to deform to the shape 221 having an elliptical shape in a direction crossing the energy-applying direction at a weld-starting position. In FIGS. 9A and 9B, larger and smaller circles described with broken lines indicate the largest and smallest diameters among the welded and deformed portions, respectively.

Irrespective of deformation before welding, when welding is performed in an angle area from zero degrees to 90 degrees in a circular direction, the cylinder members are deformed to an elliptical shape due to thermal expansion, and an amount of deformation increases. When the welding proceeds to an angle of 180 degrees, the elliptical deformation is relieved by expansion due to welding progress in an angle area from 90 degrees to 180 degrees and by shrinkage due to solidification in the angle area from zero degree to 90 degrees. Then, the amount of the deformation is decreased. When the welding proceeds to an angle of 270 degrees, the relieved elliptical deformation is again enlarged by expansion due to welding progress in an angle area from 180 degrees to 270 degrees. When the welding proceeds to an angle of 360 degrees, the elliptical deformation is relieved by expansion due to welding progress in an angle area from 270 degrees to 360 degrees and by shrinkage due to solidification in the angle area from 180 degree to 270 degrees. Then, the amount of the deformation decreases. As the welding proceeds in the angle area, the amount of the deformation increases and decreases. The cylinder members are deformed to an elliptical shape due to welding. Even when the welding proceeds beyond 360 degrees and the same portion is welded many times, the above-described deformation process is repeated at the previously-welded portions. In a member requiring metal sealing, when the member is deformed by welding, sealing performance is degraded.

In FIGS. 9A and 9B, large and small circles shown with broken lines indicate the largest and smallest diameters among the welded and deformed portions, respectively. The shape 220, being substantially circular, tends to be deformed to the elliptical shape 221 in a direction crossing the energy-applying direction at a weld-starting position.

In order to restrict both cylinder members from being deformed due to the method where energy is applied to both in a single direction, the following method is considered. As shown in FIG. 10, energy is applied to both cylinder members at two positions simultaneously in directions opposing each other at 180 degrees. However, energy is applied to the outer and inner cylinder members 200 and 201 at two positions opposing each other in the radial direction, and both cylinder members are readily deformed at two positions. Therefore, both cylinder members are readily deformed in a direction perpendicular to the energy-applying direction. Accordingly, a shape 230, substantially having a complete circular shape before welding as shown in FIG. 11A, tends to be deformed to a shape 231 having an elliptical shape after welding, shown in FIG. 11B, in a direction crossing the energy-applying directions at weld-starting positions. In FIGS. 11A and 11B, large and small circles shown with broken lines indicate the largest and smallest diameters among the welded and deformed portions, respectively.

When foreign matter is mixed into a portion to be melted with applied energy, the foreign matter may be evaporated by the applied energy, so that pores are sometimes generated at the welded portion. When pores are generated at the welded portion, welding failure may occur.

SUMMARY OF THE INVENTION

It is a first object of an embodiment of the present invention to provide a welding machine and a welding method, for welding cylinder members together in the circular direction, which prevents the cylinder members from being deformed and which corrects the deformation of a portion to be welded. It is another object of an embodiment of the present invention to provide a welding method which prevents pores from being generated at a welded portion. It is another object of an embodiment of the present invention to provide a welding machine for reducing fuel leakage of an injector.

For example, when a cylinder member is press-fitted into a different cylinder member before welding, the deformation of the cylinder members due to this press-fitting can be corrected by welding.

According to a welding machine in an embodiment of the present invention, energy-applying units, for applying energy generated by an energy source to cylinder members, are disposed outside the cylinder members at two positions. An angle by which the energy-applying units are separated from each other in a circular direction about the cylinder members is defined by θ degrees, where $80 \leq \theta \leq 100$. That is, the energy-applying units melt the cylinder members at two positions separated from each other at approximately 90 degrees in the circular (circumferential or peripheral) direction. Therefore, the cylinder members are deformed in two directions perpendicular to each other, and the cylinder members are uniformly deformed at the welded portions, thereby preventing the welded portions of the cylinder members from being deformed overall. Further, the cylinder members are uniformly deformed at the welded portions, thereby correcting a shape of a portion to be welded, if it is deformed before welding.

Additionally, energy-applying units, for applying energy generated by an energy source to cylinder members, may be disposed outside the cylinder members at multiple positions. When the number of the energy-applying units is defined by "n" and an angle "θ," by which the neighboring energy-applying units are separated from each other in a circular direction about the cylinder members, a relationship exists such that $[(360/n)-10] \leq \theta \leq [(360/n)+10]$. Therefore, three or more energy-applying units may melt the cylinder members at three or more positions separated from each other substantially by the same angle in the circular direction, that is, around the periphery of the circular members. Thus, the cylinder members are uniformly deformed at the welded portions, thereby preventing the welded portions of the cylinder members from being deformed overall. Further, the cylinder members are uniformly deformed at the welded portions, thereby correcting a shape of a portion to be welded, if it is deformed before welding.

According to a welding machine in an embodiment of the present invention, the energy-applying units are disposed in a plane perpendicular to a center axis of the cylinder members, and the energy is introduced from the energy-applying units to the cylinder members along the intersection of the plane and the outer cylinder member. Therefore, the direction in which the energy is applied to the cylinder members does not change with respect to the axis of the cylinder members, thereby uniformly welding the cylinder members around their periphery.

According to an embodiment of the present invention, the welding machine is used as an injector welding machine. Using the welding machine, a housing member and a valve body as a cylinder member are welded to each other by melting them in a circular direction. Since the housing member and the valve body are uniformly deformed at all of their welded portions, they can be prevented from overall deformation at their welded portions. Further, if a shape of their portions to be welded are deformed before welding, that can be corrected. An off-center situation between the valve body and the valve member is reduced while the complete-circle degree (circularity) of an inner peripheral surface (forming a valve seat) of the valve body is improved. Further, when the valve member is seated on the valve seat, a clearance between the valve seat and the valve member becomes smaller. Therefore, seat performance between the valve seat and the valve member is improved. Accordingly, when the valve member is seated on the valve seat, an amount of fuel, leaked from the clearance between the valve seat and the valve member, is reduced.

According to a welding machine of another embodiment of the present invention, a movable core and the valve member as cylinder members are welded to each other by melting them about their peripheries. Since the movable core and the valve member are uniformly deformed at all of their welded portions, overall deformation can be prevented. Further, if a shape of their portions, to be welded, is deformed before welding, that also can be corrected. An off-center situation between the valve body and the valve member is reduced while overall circularity of the valve member is improved. Further, when the valve member is seated on the valve seat, a clearance between the valve seat and the valve member becomes smaller. Therefore, seat performance between the valve seat and the valve member is improved. Accordingly, when the valve member is seated on the valve seat, an amount of fuel, leaked from the clearance between the valve seat and the valve member, is reduced.

According to a welding machine in an embodiment of the present invention, the housing member and a magnetic member as cylinder members are welded to each other by melting them in a circular direction (around a periphery). Since the housing member and the magnetic member are uniformly deformed at all of their welded portions, they can be prevented from being deformed at their welded portions. Further, if a shape of their portions, to be welded, are deformed before welding, that also can be corrected. Further, circularity of the housing member is improved, thereby reducing an off-center situation between the valve member and the valve body welded to the housing member. Further, when the valve member is seated on the valve seat, a clearance between the valve seat and the valve member becomes smaller. Therefore, seat performance between the valve seat and the valve member is improved. Accordingly, when the valve member is seated on the valve seat, an amount of fuel, leaked from the clearance between the valve seat and the valve member, is reduced.

Further, the cylinder members may be welded together while the cylinder members are rotated about the center axis of the cylinder members, as a rotation axis, relative to the energy-applying units. Then, a portion of the cylinder members, melted by the energy applied from one of the neighboring energy-applying units in the circular direction, is again melted by the energy applied from another unit. This is a type of secondary heat application. Therefore, even when pores are generated in a portion of the cylinder members welded by the energy applied from one of the energy-applying units, the portion is again melted by energy applied from another unit, so that the pores are eliminated during the second melting.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
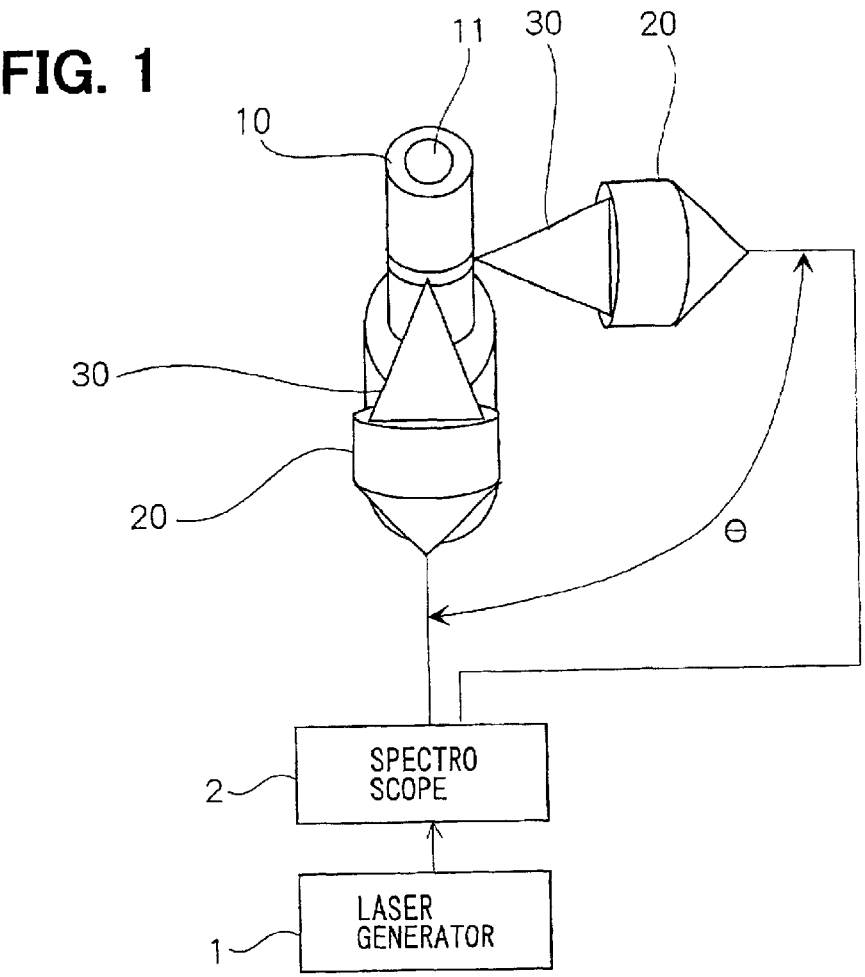
FIG. 1 is a schematic perspective view showing a welding machine in an embodiment of the present invention.

FIG. 1 is a schematic view showing a welding machine in an embodiment of the present invention. An outer cylinder member 10 and an inner cylinder member 11 have circular cross-sections, and the inner cylinder member 11 is press-fitted into the outer cylinder member 10. For example, the outer and inner cylinder members 10, 11 could be a combination of a housing of an injector and a nozzle body, respectively.

A laser generator 1 as an energy source generates a high-energy laser beam such as an yttrium aluminum garnet (YAG) laser beam and a carbon oxide ($CO_2$) laser beam. A laser beam, generated by the laser generator 1, is dispersed in two directions by a spectroscope 2. Two dispersed laser beams are focused on the outer cylinder member 10 by two optical heads 20 as energy-applying units, respectively. The optical heads 20 are disposed outside the outer and inner cylinder members 10, 11 in a plane perpendicular to a center, longitudinal axis of both cylinder members 10, 11. Further, the optical heads 20 are separated from each other by approximately 90 degrees in a circular direction about the center, longitudinal axis of the cylinder members 10, 11. The laser beams 30, focused on the outer cylinder member 10 by the optical heads 20, are introduced along a plane perpendicular to the center axis of both cylinder members 10, 11. The outer and inner cylinder members 10, 11 are completely welded to each other in the circular direction using the laser beams 30 focused by the optical heads 20. An arc discharge beam and an electron beam may be used as high energy for welding both cylinder members together.

When the outer and inner cylinder members 10, 11 are completely welded to each other in the circular direction, they are rotated relative to the optical heads 20. When possible, the optical heads 20 may be rotated about both cylinder members 10, 11. Further, the outer and inner cylinder members 10, 11 may be rotated more than one revolution. Thus, a portion, melted by the laser beam 30 at a front side in a rotational direction, is again melted by the laser beam 30 at a rear side in the rotational direction.

Next, description will be made on welding operations of the welding machine in an embodiment of the present invention. In FIGS. 3A–4B, large and small circles noted with broken lines indicate the largest and smallest diameters among the welded and deformed portions, respectively. The optical heads 20 are disposed outside the outer cylinder member 10 and separated from each other substantially by 90 degrees. The outer and inner cylinder members 10, 11 are welded to each other at two positions separated from each other substantially by 90 degrees about the periphery of the cylinder members 10, 11. When the welding is performed by applying the laser beam 30 only in a single direction, relative thermal distortion is generated among a non-melted portion, a melted portion by applying the laser beam 30, and a portion starting solidification. For this relative thermal distortion, both cylinder members tend to deform in a direction crossing the applying direction of the laser beam 30.

Figure 2:
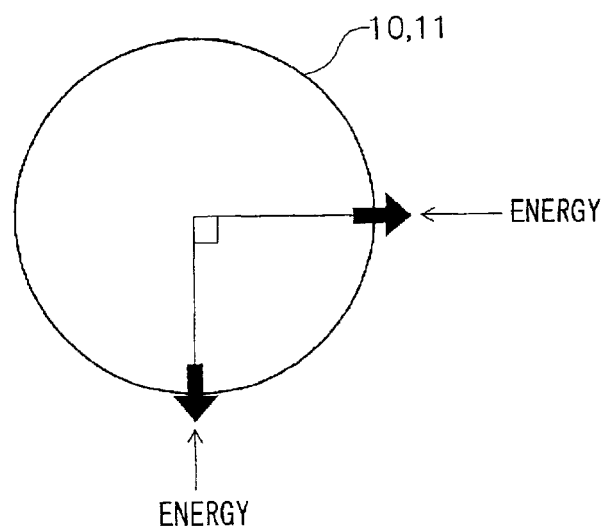
FIG. 2 is a schematic explanation view showing deformation due to welding of both cylinder members.

In the present example, the laser beams 30 are focused on the outer cylinder member 10 at two positions separated from each other by approximately 90 degrees. Therefore, the laser beam 30 is focused on the outer cylinder member 10 by one of the two optical heads 20 in a direction where the outer and inner cylinder members 10, 11 are deformed due to the laser beam 30 focused by the other of the two optical heads 20. Accordingly, as shown in FIG. 2, the directions, in which the outer and inner cylinder members 10, 11 are deformed due to the laser beams 30, are perpendicular to each other. Thus, both cylinder members are uniformly deformed in radial directions.

Figure 3A:
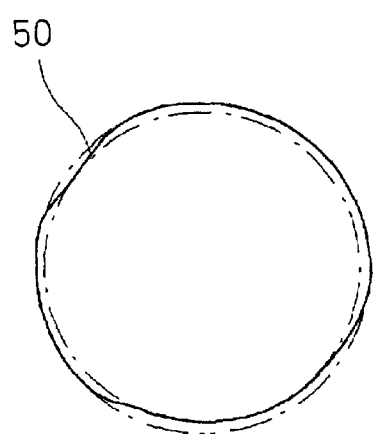
FIG. 3A is a schematic explanation view showing a cross-section of a cylinder member in a case of high working accuracy before welding.
Figure 3B:
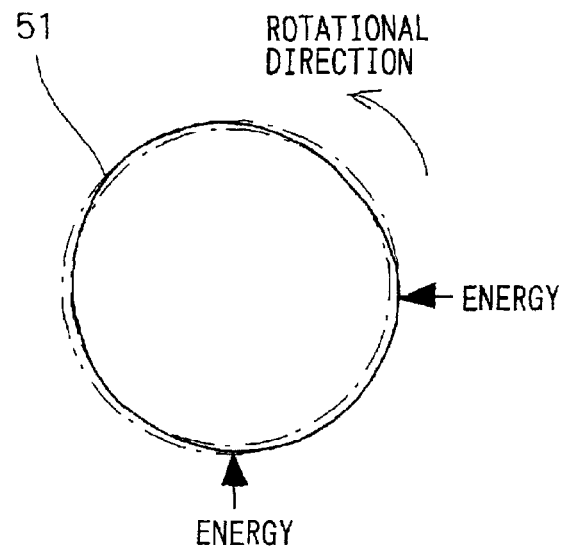
FIG. 3B is a schematic explanation view showing a cross-section of a cylinder member in a case of high working accuracy after welding.
Figure 4A:
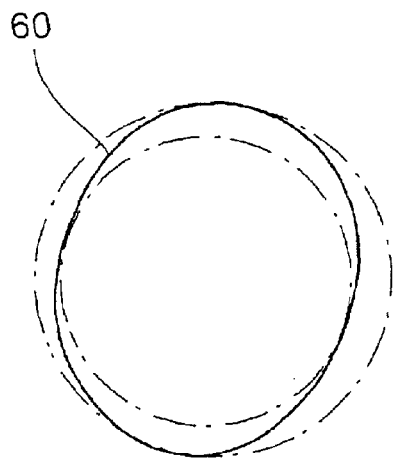
FIG. 4A is a schematic explanation view showing a cross-section of a cylinder member in a case of low working accuracy before welding.
Figure 4B:
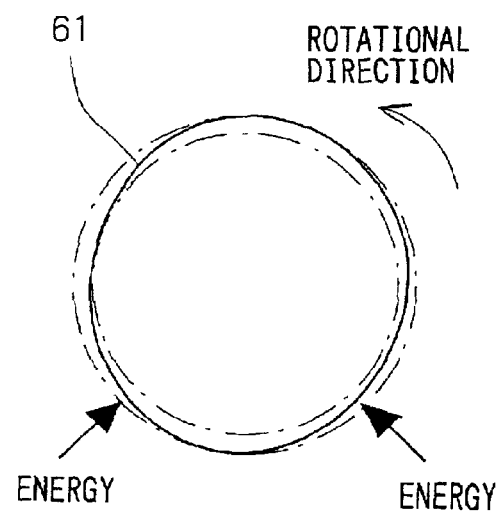
FIG. 4B is a schematic explanation view showing a cross-section of a cylinder member in a case of low working accuracy after welding.

As shown in FIG. 3A, when a pre-welding shape 50 of both cylinder members is substantially a circle due to a high working accuracy for both cylinder members, a post-welding shape 51 thereof shown in FIG. 3B can also be maintained to be substantially a circle. As shown in FIG. 4A, even when a pre-welding shape 60 of both cylinder members is deformed due to a low working accuracy for both cylinder members, both cylinder members are uniformly deformed in two directions perpendicular to each other. Therefore, the deformation of the pre-welding shape 60 is corrected to a post-welding shape 61 of both cylinder members, shown in FIG. 4B, which is substantially a circle.

Figure 5A:
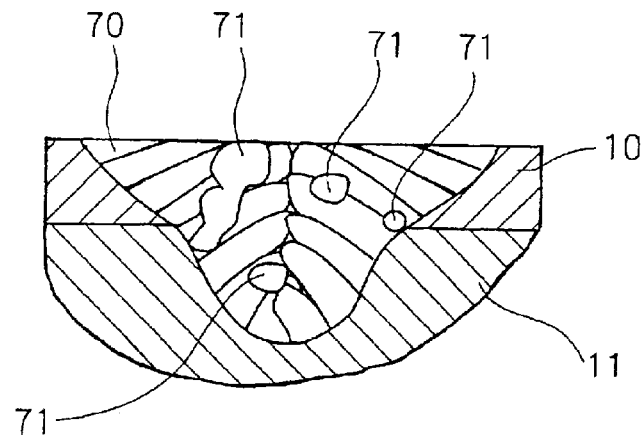
FIG. 5A is a schematic sectional view showing a welded portion with pores formed before invoking two-time welding techniques.
Figure 5B:
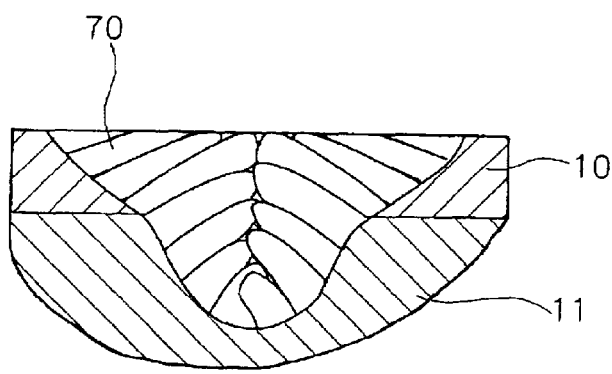
FIG. 5B is schematic cross-sectional view showing deformation of a welded portion with no pores after invoking two-time welding techniques.

When foreign matter and the like are mixed into a portion of both cylinder members 10, 11 to be welded, the following problem occurs. That is, as shown in FIG. 5A, when the portion containing the foreign matter is melted by the laser beam focused with one of the optical heads 20, pores 71 are generated in the welded portion 70 containing the foreign matter. However, the laser beam 30 is focused on the welded portion 70 by the other of the optical heads 20, and the welded portion is again melted, so that the pores 71 are eliminated as shown in FIG. 5B.

Figure 6:
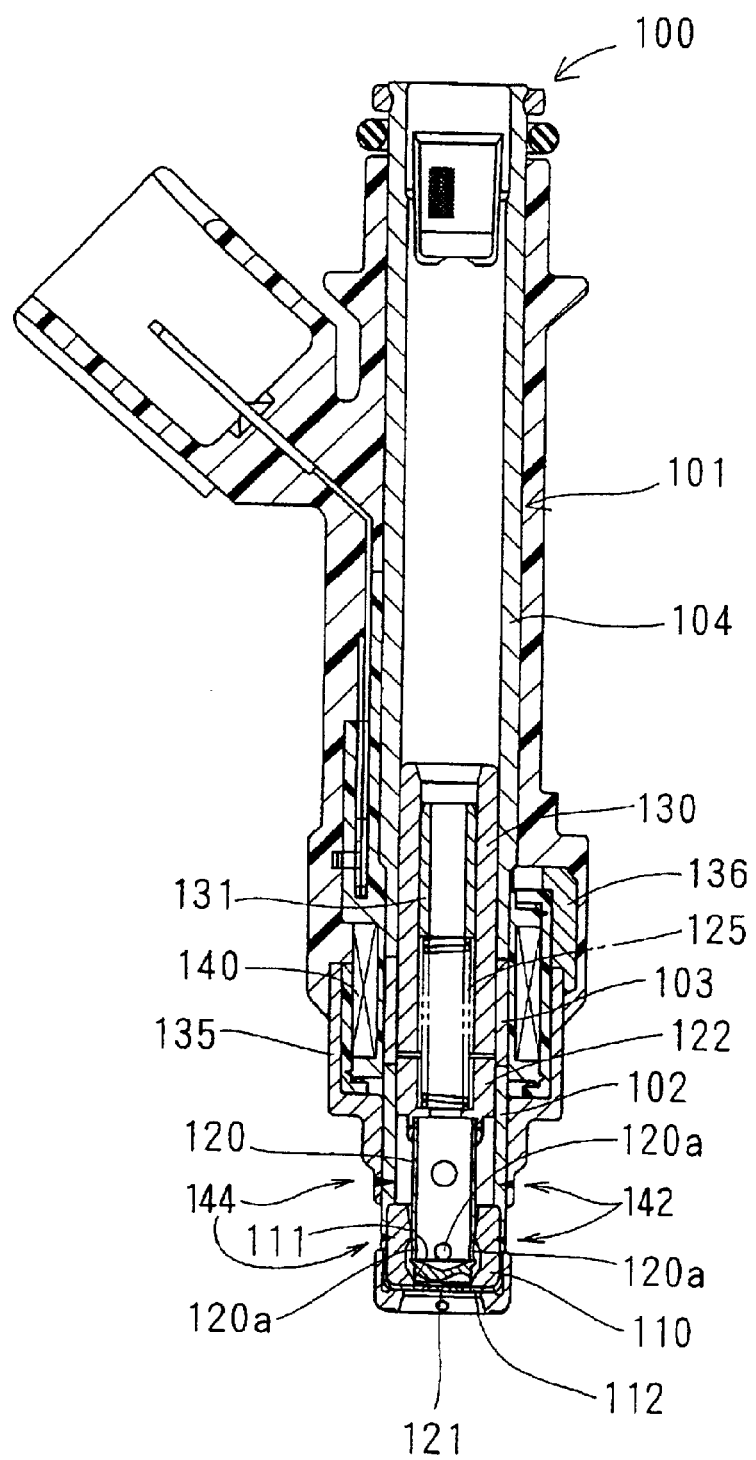
FIG. 6 is a cross-sectional view showing an injector welded by a welding machine of an embodiment of the present invention.
Figure 8:
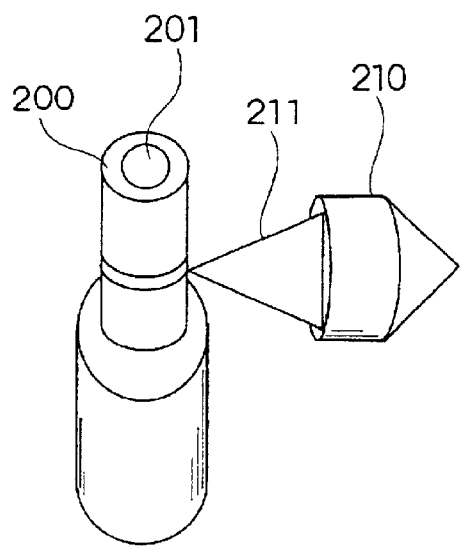
FIG. 8 is a schematic perspective view showing a welding machine in a conventional example 1.
Figure 9A:
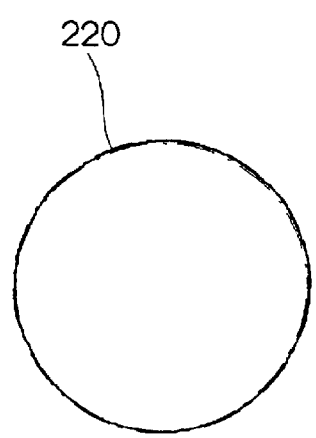
FIG. 9A is a schematic explanation view showing cross section deformation of a cylinder member before welding in a conventional example 1 of FIG. 8.
Figure 9B:
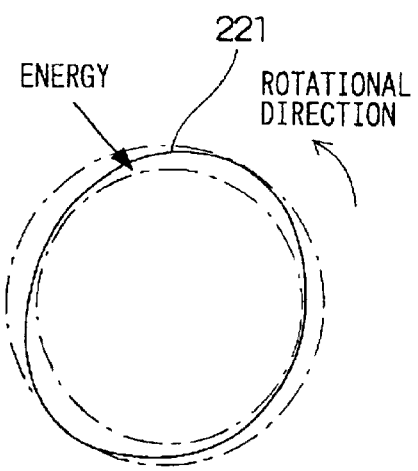
FIG. 9B is a schematic explanation view showing the cross section deformation of a cylinder member after welding in a conventional example 1 of FIG. 8.
Figure 10:
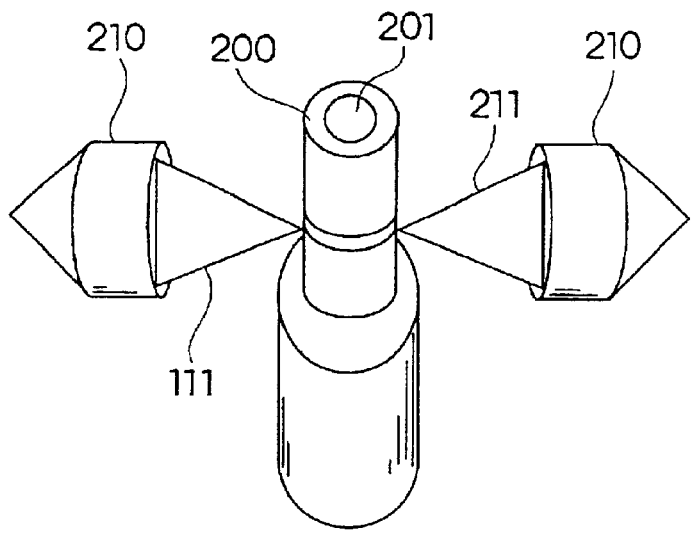
FIG. 10 is a schematic perspective view showing a welding machine in a conventional example 2.
Figure 11A:
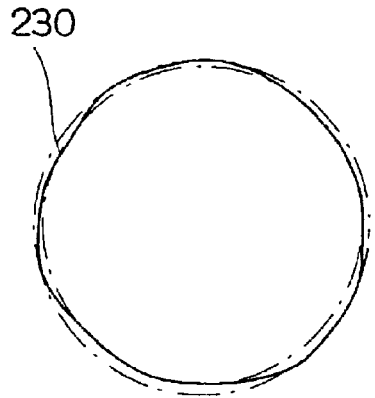
FIG. 11A is a schematic explanation view showing cross-section deformation of both cylinder members before welding in the conventional example 2 of FIG. 10.
Figure 11B:
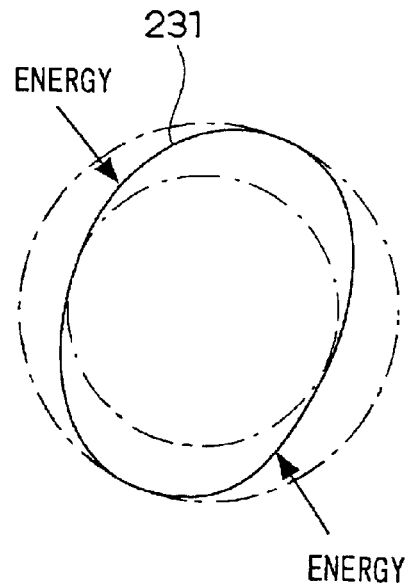
FIG. 11B is a schematic explanation view showing cross-section deformation of both cylinder members after welding in the conventional example 2 of FIG. 10.

For example, the welding machine of the present example is used to weld cylinder members of an injector 100 shown in FIG. 6. The cylinder members described above may correspond to a valve housing 101, a valve body 110, a valve member 120, a movable core and a magnetic member 135 of the injector 100. In FIG. 6, welded portion locations 142, 144 are indicative of weld locations but welding is not limited to those locations. At first, a structure of the injector 100 will be described.

In FIG. 6, the valve housing 101 as a housing member of the injector 100 is integrally formed so that a first magnetic portion 102, a non-magnetic portion 102 as a magnetic resistance portion and a second magnetic portion 104 are disposed from a fuel injection side in this order. The valve housing 101 is magnetized, and thereafter the non-magnetic portion 103 is non-magnetized by heating a portion of the valve housing 101. Thus, the first and second magnetic portions 102 and 104 remain magnetized. An inner peripheral wall of the first magnetic portion 102 is welded to an outer peripheral wall of the valve body 110. The valve housing 101 contains the valve member 120 and the movable core 122 being capable of reciprocating therein. A cup-shaped injection hole plate 112 is welded to the outer peripheral wall of the valve body 110, and is sandwiched between the valve body 110 and a supporting member. The injection hole plate 112, formed in a thin plate shape, defines plural holes (injection holes) in its center portion.

The valve member 120, formed in a cylindrical shape having a bottom, includes a contacting portion 121 at the bottom. The contacting portion 121 can be seated onto a valve seat provided on the inner peripheral wall of the valve body 110. The cylindrical movable core 122 is welded to the valve member 120 at an opposite side of the injection holes. A side wall of the valve member 120 defines plural fuel through holes 120a at an upstream side of the contacting portion 121. Fuel passes through the fuel through holes 120a from the inside to the outside, and flows toward a seat portion constructed by the contacting portion 121 and the valve seat 111. When the contacting portion 121 is seated onto the valve seat 111 using force applied by a spring 125, the injection holes are closed, and fuel injection is stopped. The movable core 122 is attracted to a fixed core 130 by energizing a coil 140 as an electromagnetic driving device, and the valve member 120 is separated from the valve seat 111 together with the movable core 122. The injection holes are released, and the fuel injection is permitted.

The fixed core 130 is disposed opposite the injection holes relative to the movable core 122, and faces the movable core 122. One end of the spring 125 is engaged to an adjusting pipe 131, and the other end thereof is engaged to the movable core 122. Force of the spring 125 is applied toward the valve seat 111.

Magnetic members 135, 136 are disposed at an outer peripheral side of the coil 140 as an electromagnetic driving device. The first magnetic portion 102 and the fixed core 130 are magnetically connected to each other by the magnetic members 135, 136 through the second magnetic portion 104. A magnetic circuit is constructed by the fixed core 130, the movable core 122, the first magnetic portion 102, the second magnetic portion 104 and the magnetic members 135, 136.

The valve body 110 is inserted into the first magnetic portion 102, and they are welded to each other by the welding machine shown in FIG. 1 in the above-described welding manner. The first magnetic portion 102 is inserted into the magnetic member 135, and they are welded to each other by the welding machine shown in FIG. 1 in the above-described welding manner. The valve member 120 is inserted into the movable core 122, and they are welded to each other by the welding machine shown in FIG. 1 in the above-described welding manner.

Figure 7:
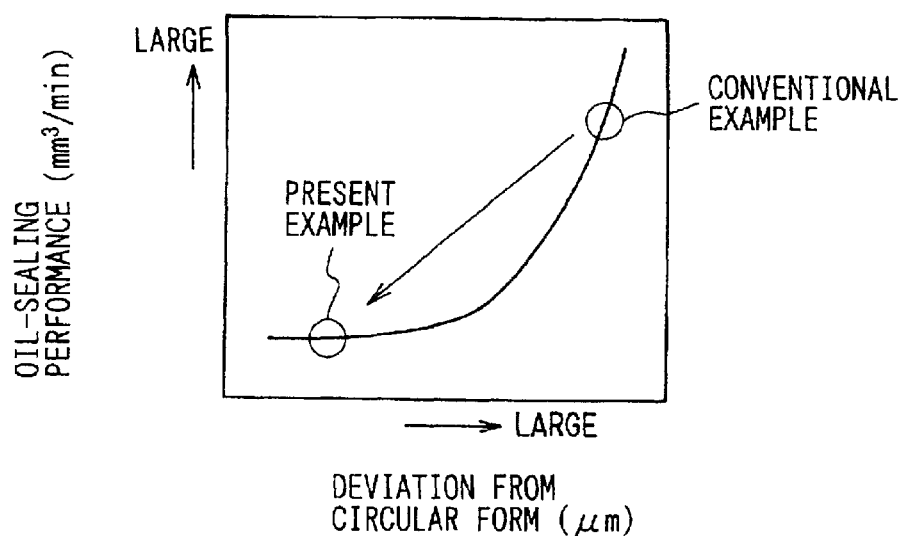
FIG. 7 is a characteristic graph showing a relationship between circularity of a cylinder member and oil-sealing performance.

Since the circularity of each cylinder member constructing the injector 100 is improved, an off-center condition between the valve body 110 and the valve member 120 is reduced. That is, coaxial alignment is improved. Further, when the valve member 120 is seated on the valve seat 111, a clearance between the valve seat 111 and the valve member 120 becomes smaller. Since seat performance between the valve seat 111 and the valve member 120 is improved, oil-tight or oil-sealing performance is improved as shown in FIG. 7. In FIG. 7, the oil-sealing performance indicates an amount of fuel leaked from the clearance between the valve seat 111 and the valve member 120 when the valve member 120 is seated on the valve seat 111. As can be seen from FIG. 7, as deviation from circular form increases, oil-sealing performance is degraded, that is, a higher flow rate of fluid results from between the clearance between the valve seat 111 and the valve member 120, for example.

In the example of an embodiment of the present invention described above, two optical heads 20, as the energy-applying units, are disposed outside the outer cylinder member 10 at two positions separated from each other by an angle θ of 90 degrees. However, the angle θ is not limited to 90 degrees, but it is permitted that $80 \leq \theta \leq 90$. Further, the laser beams 30 are focused in directions perpendicular to the center axis of both cylinder members. However, the laser beams 30 may be focused in directions that are not perpendicular to the center axis of the cylinder members.

The number of the optical heads 20 is not limited to two, but three or more optical heads 20 may be disposed outside the outer cylinder member 10 at three or more positions separated from each other substantially by the same angle. Then, the outer and inner cylinder members 10, 11 may be welded to each other. When three or more energy-applying units are disposed, the number of the energy-applying units is defined by "n", and an angle "θ", by which the neighboring optical heads 20 are separated from each other in the circular direction about both cylinder members, is defined. At this time, the optical heads 20 are disposed so that $[(360/n)-10] \leq \theta \leq [(360/n)+10]$. When the structure of the welding machine is considered, the number of the optical heads 20 is unlikely to exceed ten.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A welding machine for welding around a circumference of cylinder members in order to join a first cylinder member and a second cylinder member into which the first cylinder member is inserted by applying welding energy to the cylinder members while relatively rotating the cylinder members with respect to the machine, the welding machine comprising:
   an energy source for generating energy, the energy being used for melting the cylinder members at a portion to be welded and for welding the cylinder members together; and
   energy-applying units for applying the energy to the cylinder members, wherein:
   the energy-applying units are disposed outside the cylinder members at two positions, and are directed to the cylinder members to apply the energy to two target points on a circumferential welding path on the cylinder members, two of the target points being angularly apart from each other by an angle of θ degrees, where 80≦θ≦100, and
   the welding machine is constructed and arranged so that the energy applying units simultaneously apply the energy to respective target points while relatively rotating the cylinder members more than one revolution with respect to the energy applying units so that the circumferential welding path is traced at least twice by the energy.

2. The welding machine according to claim 1, wherein:
   the energy-applying units are disposed on a plane perpendicular to a center axis of the cylinder members; and
   the energy is introduced from the energy-applying units to the cylinder members along the plane.

3. The welding machine according to claim 1, wherein the welding machine is constructed and arranged to join cylinder members of an injector comprising:
   a valve body including a valve seat;
   a valve member for stopping fuel injection when seated on the valve seat, and for permitting fuel injection when separated from the valve seat;
   a movable core connected to the valve member at an opposite side of the valve seat, the movable core reciprocating together with the valve member;
   a fixed core disposed opposite the valve member relative to the movable core, the fixed core facing the movable core;
   an electromagnetic driving device for generating magnetic force by which the movable core is attracted to the fixed core; and
   a housing member of which inner peripheral wall is connected to an outer peripheral wall of the valve body, the housing member containing the movable core so as to reciprocate therein,
   wherein the welding machine is adapted to join the valve body as a first cylinder member inserted into the housing member as a second cylinder member, and the valve body and the housing member are welded to each other by melting them about a circumference of the housing member.

4. The welding machine according to claim 3, wherein:
   the welding machine is adapted to join the valve member as a first cylinder member inserted into the movable core as a second cylinder member, and the valve member and the movable core are welded to each other by melting them about the circumference of the movable core.

5. The welding machine according to claim 4, wherein:
   the injector includes a magnetic member, disposed outside the housing member and the fixed core, for magnetically connecting the housing member and the fixed core;
   the welding machine is adapted to join the housing member as a first cylinder member and inserted into the magnetic member as a second cylinder member, and the housing member and the magnetic member are welded to each other by melting them about the circumference of the magnetic member.

6. The welding machine according to claim 3, wherein:
   the injector includes a magnetic member, disposed outside the housing member and the fixed core, for magnetically connecting the housing member and the fixed core;
   the welding machine is adapted to join the housing member as a first cylinder member and inserted into the magnetic member as a second cylinder member, and the housing member and the magnetic member are welded to each other by melting them about the circumference of the magnetic member.

7. A welding machine for welding around a circumference of cylinder members in order to join a first cylinder member and a second cylinder member into which the first cylinder member is inserted by simultaneously applying welding energy to the cylinder members while relatively rotating the cylinder members with respect to the machine, the welding machine comprising:
   an energy source for generating energy, the energy being used for melting the cylinder members at a portion to be welded and for welding the cylinder members together; and
   a plurality of energy-applying units for applying the energy to the cylinder members, wherein:
   the number of energy-applying units is three or more;
   the energy-applying units are disposed outside the cylinder members at respective positions, and are directed to the cylinder members to apply the energy to "n" target points on a circumferential welding path on the cylinder members, the "n" target points being angularly spaced apart from each other by an angle of θ degrees, where [(360/n)−10]≦θ≦[(360/n)+10], and
   the welding machine is constructed and arranged so that the energy applying units simultaneously apply the energy to respective target points while relatively rotating the cylinder members more than one revolution with respect to the energy applying units so that the circumferential welding path is traced at least "n" times by the energy.

8. The welding machine according to claim 7, wherein the welding machine is conducted and arranged to join two cylinder members of an injector comprising:
   a valve body including a valve seat;
   a valve member for stopping fuel injection when seated on the valve seat, and for permitting fuel injection when separated from the valve seat;
   a movable core connected to the valve member at an opposite side of the valve seat, the movable core reciprocating together with the valve member;
   a fixed core disposed opposite the valve member relative to the movable core, the fixed core facing the movable core;

an electromagnetic driving device for generating magnetic force by which the movable core is attracted to the fixed core; and a housing member of which inner peripheral wall is connected to an outer peripheral wall of the valve body, the housing member containing the movable core so as to reciprocate therein, wherein the welding machine is adapted to join the valve body as a first cylinder member inserted into the housing member as a second cylinder member, and they are welded to each other by melting them about a circumference of the housing member.

9. The welding machine according to claim 8, wherein:
the valve member as a first cylinder member inserted into the movable core as a second cylinder member, and the valve member and the movable core are welded to each other by melting them about the circumference of the movable core.

10. The welding machine according to claim 9, wherein:
the injector includes a magnetic member, disposed outside the housing member and the fixed core, for magnetically connecting the housing member and the fixed core;

the housing member as a first cylinder member inserted into the magnetic member, and the housing member and the magnetic member are welded to each other by melting them about the circumference of the magnetic member.

11. The welding machine according to claim 8, wherein:
the injector includes a magnetic member, disposed outside the housing member and the fixed core, for magnetically connecting the housing member and the fixed core;

the housing member as a first cylinder member inserted into the magnetic member, and the housing member and the magnetic member are welded to each other by melting them about the circumference of the magnetic member.

12. The welding machine according to claim 7, wherein:
the energy-applying units are disposed on a plane perpendicular to a center axis of the cylinder members; and the energy is introduced from the energy-applying units to the cylinder members along the plane.

13. The welding machine according to claim 12, wherein the welding machine is conducted and arranged to join two cylinder members of an injector comprising:

a valve body including a valve seat;

a valve member for stopping fuel injection when seated on the valve seat, and for permitting fuel injection when separated from the valve seat;

a movable core connected to the valve member at an opposite side of the valve seat, the movable core reciprocating together with the valve member;

a fixed core disposed opposite the valve member relative to the movable core, the fixed core facing the movable core;

an electromagnetic driving device for generating magnetic force by which the movable core is attracted to the fixed core; and a housing member of which inner peripheral wall is connected to an outer peripheral wall of the valve body, the housing member containing the movable core so as to reciprocate therein, wherein the welding machine is adapted to join the valve body as a first cylinder member inserted into the housing member as a second cylinder member, and the valve body and the housing member are welded to each other by melting them about a circumference of the housing member.

14. The welding machine according to claim 13, wherein:

the injector includes a magnetic member, disposed outside the housing member and the fixed core, for magnetically connecting the housing member and the fixed core;

the magnetic member is the second cylinder member; and the housing member is the first cylinder member and is inserted into the magnetic member, and the housing member and the magnetic member are welded to each other by melting them about the circumference of the magnetic member.

15. The welding machine according to claim 13, wherein:

the valve member as the first cylinder member inserted into the movable core as a second cylinder member, and the valve member and the movable core are welded to each other by melting them about the circumference of the movable core.

16. The welding machine according to claim 15, wherein:

the injector includes a magnetic member, disposed outside the housing member and the fixed core, for magnetically connecting the housing member and the fixed core;

the housing member as a first cylinder member inserted into the magnetic member, and the housing member and the magnetic member are welded to each other by melting them about the circumference of the magnetic member.

17. A welding method for welding cylinder members together using a welding machine, the welding method comprising:

relatively rotating a first cylinder member and a second cylinder member about a center axis located inside of the first and second cylinder members with respect to the welding machine;

providing a first energy applying unit disposed outside of the first cylinder member and the second cylinder member to apply the energy on a first target point on a circumferential welding path to join the first cylinder member and the second cylinder member;

providing a second energy applying unit disposed outside of the first cylinder member and the second cylinder member to apply the energy on a second target point on the circumferential welding path to join the first cylinder member and the second cylinder member, the second target point being angularly apart from the first target point with respect to a rotating direction of the first cylinder member and the second cylinder member;

providing an energy source for generating energy for the energy applying units;

applying energy to the first cylindrical member and the second cylindrical member through the first energy applying unit and the second energy applying unit simultaneously while the first cylinder member and the second cylinder member are rotated for more than one revolution with respect to the energy applying units so that the circumferential welding path is traced at least twice by the applied energy;

melting the first cylindrical member and the second cylindrical member a first time with the first energy applying unit or the second energy applying unit as the cylindrical members are rotated;

welding the first cylindrical member and the second cylindrical member a first time with the first energy applying unit or the second energy applying unit as the cylindrical members are rotated;

melting the first cylindrical member and the second cylindrical member a second time with the second energy applying unit or the first energy applying unit as the cylindrical members are rotated; and welding the first cylindrical member and the second cylindrical member a second time with the second energy applying unit or the first energy applying unit as the cylindrical members are rotated.

18. The welding method according to claim 17, wherein the first target point and the second target point are angularly apart from each other by an angle of θ degrees, where 80≦θ≦100.

19. The welding method according to claim 17, further comprising at least one additional energy applying unit to provide a total of "n" energy-applying units and "n" target points, wherein the "n" target points are angularly spaced apart from each other by an angle of θ degrees, where [(360/n)−10]≦θ≦[(360/n)+10].

20. The welding method according to claim 17, wherein the first cylinder member is inserted into the second cylinder member, and the circumferential welding path is placed outside of the second cylinder member within which the first cylinder member is located.

21. The welding method according to claim 20, wherein the welding energy applied by the first energy applying unit and the second energy applying unit is capable of melting the second cylinder member and only an outside portion of the first cylinder member located just inside the second cylinder member.

22. A method for manufacturing an injector, the method comprising:

providing a first cylinder member having a cylinder portion;

providing a second cylinder member having a cylinder portion into which the cylinder portion of the first cylinder member is able to insert;

inserting the first cylinder member into the second cylinder member to make the cylinder portions overlapped in radial direction; and welding the second cylinder member and the first cylinder member along a circumferential welding path that forms a closed circle around the second cylinder member and is located on an overlapped area of the first and second cylinder member, wherein the welding step further comprises:

simultaneously applying welding energy onto a first target point and a second target point both located on the circumferential welding path, the second target point being angularly spaced apart from the first target point by an angle of θ degrees, where 80≦θ≦100; and simultaneously moving both the first and second target points along the circumferential welding path more than one revolution while keeping the angle θ between the first and second target points by relatively rotating the assembly of the first and second cylinder member with respect to a welding machine so that the circumferential welding path is traced at least twice by the welding energy.

23. The method for manufacturing an injector according to claim 22, wherein the first cylinder member is a valve body having a valve seat portion on which a valve member is able to seat in order to control fuel injection and a cylinder portion in which the valve member is reciprocally accommodated, and the second cylinder member is a housing having a cylinder portion into which the cylinder portion of the valve body is able to insert.

24. The method for manufacturing an injector according to claim 23, wherein the welding energy is capable of melting the housing and only outside portion of the valve body located just inside the housing.

25. The method for manufacturing an injector according to claim 22, wherein the first cylinder member is a housing having a cylinder portion defining a fuel passage, and the second cylinder member is a magnetic member having a cylinder portion into which the cylinder portion of the housing is able to insert and a portion placed outside a electromagnetic coil for conducting magnetic flux.

26. The method for manufacturing an injector according to claim 22, wherein the first cylinder member is a valve member having a cylinder portion defining a fuel passage and is able to seat on a seat portion of a valve body in order to control fuel injection, and the second cylinder member is a movable core having a cylinder portion into which the cylinder portion of the valve member is able to insert.

27. A method for manufacturing an injector, the method comprising the steps of:

providing a first cylinder member having a cylinder portion;

providing a second cylinder member having a cylinder portion into which the cylinder portion of the first cylinder member is able to insert;

inserting the first cylinder member into the second cylinder member to make the cylinder portions overlapped in radial direction; and welding the second cylinder member and the first cylinder member along a circumferential welding path that forms a closed circle around the second cylinder member and is located on an overlapped area of the first and second cylinder member, wherein the welding step further comprises:

simultaneously applying welding energy onto "n" target points located on the circumferential welding path, "n" being three or more, the "n" target points being angularly apart from each other by an angle of θ degrees, where [(360/n)−10]≦θ≦[(360/n)+10]; and simultaneously moving all of the target points along the circumferential welding path more than one revolution while keeping the angle θ between the target points by relatively rotating the assembly of the first and second cylinder member with respect to a welding machine so that the circumferential welding path is traced at least twice by the welding energy.

28. The method for manufacturing an injector according to claim 27, wherein the first cylinder member is a valve body having a valve seat portion on which a valve member is able to seat in order to control fuel injection and a cylinder portion in which the valve member is reciprocally accommodated, and the second cylinder member is a housing having a cylinder portion into which the cylinder portion of the valve body is able to insert.

29. The method for manufacturing an injector according to claim 28, wherein the welding energy is capable of melting the housing and only outside portion of the valve body located just inside the housing.

30. The method for manufacturing an injector according to claim 27, wherein the first cylinder member is a housing having a cylinder portion defining a fuel passage, and the second cylinder member is a magnetic member having a cylinder portion into which the cylinder portion of the housing is able to insert and a portion placed outside a electromagnetic coil for conducting magnetic flux.

31. The method for manufacturing an injector according to claim 27, wherein the first cylinder member is a valve member having a cylinder portion defining a fuel passage and is able to seat on a seat portion of a valve body in order to control fuel injection, and the second cylinder member is a movable core having a cylinder portion into which the cylinder portion of the valve member is able to insert.

* * * * *